US010229251B1

(12) United States Patent
Dalessio et al.

(10) Patent No.: US 10,229,251 B1
(45) Date of Patent: Mar. 12, 2019

(54) LIBRARY SCAN FOR LIVE APPLICATIONS

(71) Applicant: Pivotal Software, Inc., San Francisco, CA (US)

(72) Inventors: Michael Dalessio, Madison, NJ (US); Justin Smith, Brooklyn, NY (US); John Shahid, Brooklyn, NY (US); James Wen, Edison, NJ (US); David Jahn, Brooklyn, NY (US); David E. Goddard, New York, NY (US); Forest Eckhardt, Brooklyn, NY (US); Mark W. Kropf, Brooklyn, NY (US); James Thomas Bayer, Palo Alto, CA (US); Brandon Shroyer, Astoria, NY (US); Kelly Gerritz, Brooklyn, NY (US); Samuel E. Smith, New York, NY (US); Gabriel Ramirez, Riverdale, MD (US); Justin T. Archie, Denver, CO (US); Amin Jamali, Hoboken, NJ (US); Daniel George Rosen, Plainview, NY (US)

(73) Assignee: Pivotal Software, Inc., San Francisco, CA (US)

( * ) Notice: Subject to any disclaimer, the term of this patent is extended or adjusted under 35 U.S.C. 154(b) by 385 days.

(21) Appl. No.: 15/235,042

(22) Filed: Aug. 11, 2016

(51) Int. Cl.
*G06F 21/10* (2013.01)
*G06F 8/60* (2018.01)

(52) U.S. Cl.
CPC ............... *G06F 21/10* (2013.01); *G06F 8/60* (2013.01); *G06F 2221/0737* (2013.01); *G06F 2221/0766* (2013.01)

(58) Field of Classification Search
CPC .... G06F 2221/0766; G06F 21/10; G06F 8/60; G06F 2221/0737; G06F 21/577; G06F 2221/033; G06F 17/30377; G06F 17/30864
See application file for complete search history.

(56) References Cited

U.S. PATENT DOCUMENTS

| 7,392,545 | B1 | 6/2008 | Weber et al. | |
|---|---|---|---|---|
| 2005/0138406 | A1 | 6/2005 | Cox | |
| 2006/0080656 | A1 | 4/2006 | Cain et al. | |
| 2006/0225072 | A1* | 10/2006 | Lari | G06F 8/61 717/175 |
| 2008/0154965 | A1 | 6/2008 | Pedersen | |
| 2012/0095802 | A1* | 4/2012 | Wilberding | G06Q 10/063 705/7.28 |

(Continued)

*Primary Examiner* — Amir Mehrmanesh
(74) *Attorney, Agent, or Firm* — Fish & Richardson P.C.

(57) ABSTRACT

Methods, systems, and computer-readable media for monitoring states of application packages deployed on a cloud-based application deployment platform. A notification service retrieves a copy of a deployed application package and metadata associated with the application package from the cloud-based deployment platform, and identifies libraries of the application package. The notification service can then determine which, if any, libraries are or will become out-of-date, and obtain license information about the libraries. The notification service can provide notifications of any outdated components and on license compatibilities or incompatibilities. The notification service can automatically restage the application package, or update the license, upon finding outdated components or license incompatibilities.

15 Claims, 8 Drawing Sheets

(56) References Cited

U.S. PATENT DOCUMENTS

| | | |
|---|---|---|
| 2012/0222122 A1 | 8/2012 | Das |
| 2016/0267447 A1* | 9/2016 | Davis ................. G06Q 20/4016 |
| 2017/0213037 A1* | 7/2017 | Toledano .............. G06F 21/552 |
| 2017/0372072 A1* | 12/2017 | Baset .................... G06F 21/577 |

* cited by examiner

LIBRARY SCAN FOR LIVE APPLICATIONS

BACKGROUND

This specification generally relates to cloud computing.

In cloud computing, a set of shared computing resources, storage resources, and network resources can be provisioned to users on demand, generally in the form of virtual machines. Multiple physical computing appliances, e.g., computers in a server farm, can provide a service platform for on-demand provisioning of these resources. The service platform is sometimes referred to as infrastructure as a service (IaaS). A set of services can enable software developers to develop, launch, and manage application programs, generally referred to simply as applications, without interacting directly with the appliances of the IaaS. An example service platform is VMware vSphere™ cloud platform software installed on a rack of Intel™ processor-based physical servers to manage these physical servers as a set of shared cloud resources.

A deployment platform can automate and simplify transforming source code or binary code representation of an application into a running instance of that application using IaaS resources. The running instance can then be accessed by end users. The deployment platform is sometimes referred to as a cloud-based application deployment platform or platform as a service (PaaS). An example of a cloud-based application deployment platform is a Pivotal Cloud Foundry® software product deployed on a set of vSphere-based cloud appliances.

SUMMARY

This specification describes methods, systems, and computer-readable media for monitoring states of application packages deployed on a cloud-based application deployment platform. A notification service retrieves a copy of a deployed application package from the cloud-based deployment platform, and determines which libraries are used by the application package. The notification service can then determine what security vulnerabilities the libraries have, and provide notifications about the vulnerabilities to a user or developer.

In some implementations, the notification service retrieves a copy of a deployed application package and metadata associated with the application package from the cloud-based deployment platform, and identifies libraries of the application package. The notification service can then determine which, if any, libraries are or will become out-of-date, and obtain license information about the libraries. The notification service can provide notifications of any outdated components and on license compatibilities or incompatibilities. The notification service can automatically restage the application package, or update the license, upon finding outdated components or license incompatibilities.

In some implementations, the notification service accesses information states represented in copies of deployed application packages. The notification service can then combine the information states with information from external databases. The information from external databases can include, for example, lists of security vulnerabilities, software library versions, and licenses defining permissible uses of various libraries. The notification service transforms a combination of the application states and external database information into notifications. The notification service then sends the transformed information to users or operators of a PaaS. These notifications can include information on 1) security vulnerabilities that exist in libraries of the application package, including vulnerabilities that are previously known by the public or newly discovered vulnerabilities; 2) libraries that are out-of-date, e.g., obsolete, deprecated, or no longer supported; and 3) the licensing status of the libraries according to a user-defined, operator-defined, or vendor-defined policy.

Particular embodiments of the subject matter described in this specification can be implemented to realize one or more of the following advantages. Compared to conventional techniques for determining security vulnerabilities, the techniques described in this specification are improvements that provide a simplified service that can present status information on security vulnerabilities, out-of-date components, and license updates in a more timely manner, e.g., immediately after a new security vulnerability is discovered, immediately after a component becomes out-of-date, or immediately after a license changes terms. In addition, prescheduled or on-demand security scans can examine an already deployed application package, rather than examine an application package at development time or at deployment time. Accordingly, security vulnerabilities that are discovered after development, e.g., newly discovered vulnerabilities to attacks, can be captured. In addition, prescheduled and on-demand security scans can be triggered conveniently using scripts, batch files, Cron jobs, and command-line inputs (CLIs), for example. Accordingly, reviews of software versions and licenses that are conventionally done manually can be done automatically.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
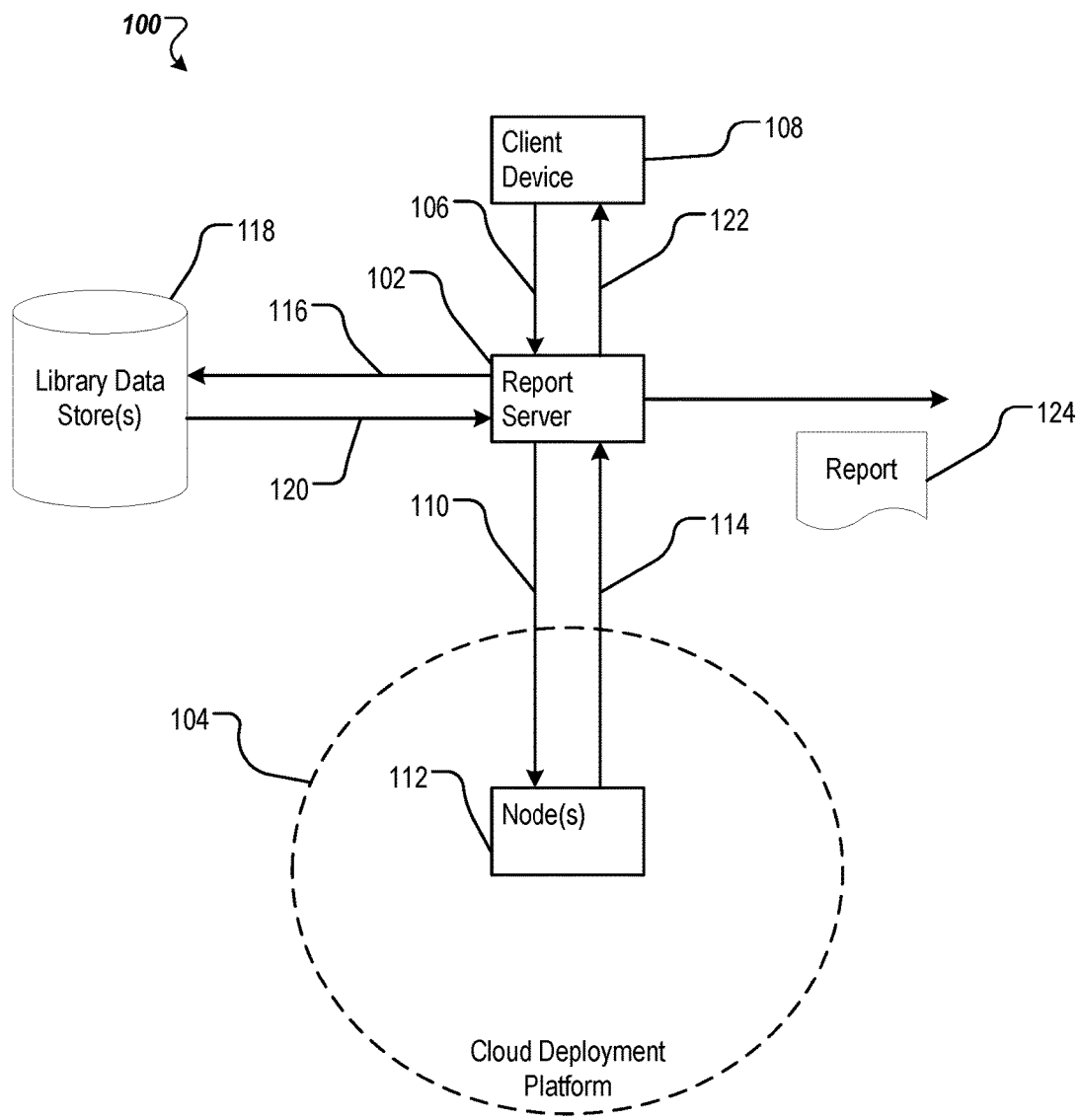
FIG. 1 is a diagram illustrating an architecture of an example notification service.

FIG. 1 is a diagram illustrating an architecture 100 of an example notification service. The notification service provides notifications on status of application packages deployed on a cloud-based deployment platform. The status can include whether an application package contains any security vulnerabilities, whether an application package uses outdated libraries, whether an application package complies with software licenses, or any combination of the above.

In the example shown, at least a portion of the notification service is performed by a report server 102. The report server 102 can be implemented on one or more physical or virtual nodes of a cloud-based application deployment platform 104, or on one or more computers separate from the cloud-based application deployment platform 104.

In the example shown, the report server 102 receives a request 106 originating from a user device 108. The user device 108 can be any computing device operated by a user, e.g., an administrator. The request 106 can include a list of one or more identifiers of application packages. Each identifier can include a name of an application package deployed on the cloud-based application deployment platform 104.

Upon receiving the request 106, the report server 102 requests (110) application data from one or more nodes 112 of the cloud-based application deployment platform 104. Each node 112 can include a computer or a virtual machine (VM) where the application package is deployed. The report server 102 receives the application data 114 in response. The application data 114 can include a copy of the deployed application package, metadata of the application package, or both. The copy of the deployed application package can include a binary of an application program and a representation of a directory structure storing the application program. The metadata can include environment variables associated with the application package, a representation of a directory structure where the application package is deployed, library inclusion paths, other information relating to library usage by the application package, or any combination of the above.

Upon receiving the application data 114, the report server 102 can identify one or more libraries of the application package. The libraries can include static and dynamic libraries used by the application package. For example, the libraries can include one or more .jar, .a, or .so files containing Java and C/C++ libraries.

The libraries can be related to each other in a hierarchical structure, where, for example, the binary executable of the application package directly uses library A, which, in turn, uses library B. The report server 102 can determine one or more dependency trees for the application package. Each dependency tree indicates hierarchical dependencies of libraries of the deployed application package. For example, the application package can depend upon a particular library contained in a file, e.g., a.jar, which, in turn, depends upon libraries contained in files b.jar and c.jar. The report server 102 can determine, from the application data 114, the hierarchy of dependencies and represent the dependencies in a tree structure where nodes representing b.jar and c.jar are children of a node representing a.jar. The report server 102 can identify the libraries and their dependencies from settings of one or more inclusion paths of the application package, from example, from an "include" environment variable that has a value of a series of paths, e.g., "/mydir1/mysubdir1; /mydir2/mysubdir2." The report server 102 can determine a respective version for each library.

The report server 102 can submit one or more queries 116 to one or more library data stores 118 to determine vulnerability of each of the libraries. Each query 116 can include a list of one or more libraries and their respective versions. Each library data store 118 is a repository of information on various libraries and various versions of libraries.

For example, a library data store can be a software vulnerability database storing information on whether, and to what degree, a particular version of a library is vulnerable to what kind of security breach. In some implementations, one library data store 118 is a national vulnerability database (NVD) provided by the National Institute of Standards and Technology (NIST). The report server 102 can retrieve status data 120 from the one or more library data stores 118. The status data 120 can include, for each library, a respective list of vulnerability identifiers and respective severity scores of the vulnerabilities.

In some implementations, the one or more library data stores 118 include a library index database that stores information on versions of libraries. For example, the library index database can store version information including a current version number of a library, e.g., a user interface library, that is the most recent release, a release date of the current version, a list of previous versions of the libraries and their respective release dates, release notes of each version, a list of differences between the current version and a previous version, a status of a previous version, e.g., whether a version of a library is supported, obsolete, or deprecated, a type of a previous version, e.g., release, debug, or beta, or any combination of the above. The status data 120 retrieved from the library index database can include version information on the particular library represented in the query 116.

In some implementations, the one or more library data stores 118 include a license database that stores license information on libraries, including, for example, whether a particular library is under public license, under what version of public license, and terms of the license. The status data 120 retrieved from the license database can include license information on the particular library represented in the query 116. The report server 102 can compare the license information with license information on file to determine whether any component of a deployed application package is in compliance with license requirements.

For example, the report server 102 can determine that an application package is deployed under license X. The application package uses library L, which is now under license Y. The report server 102 can determine that license X is different from license Y, and that license Y is more restrictive in that it contains one or more rules not specified in license X. Upon determining that license Y is more restrictive, the report server 102 can temporarily suspend the application package until a license manager accepts terms in license Y.

The report server 102 can provide status information 122 to the user device 108 as a response to the request 106. The status information 122 can include vulnerability information, version information, license information including differences in license terms, or any combination of the above. The user device 108 can then present the status information 122 for each component of the application package for storage in a status database, for input to a status consumer program, e.g., a security monitoring program, or for output to an output device, e.g., a display surface or a printer. Alternatively or additionally, the report server 102 can generate a report 124 from the status information 122. The report server 102 can provide the report 124 to the user device 108 or a device other than user device 108. For example, the report server 102 can provide the report 124 as an electronic mail, text message, or other type of message to a mobile device that is specified in the request 106.

Figure 2:
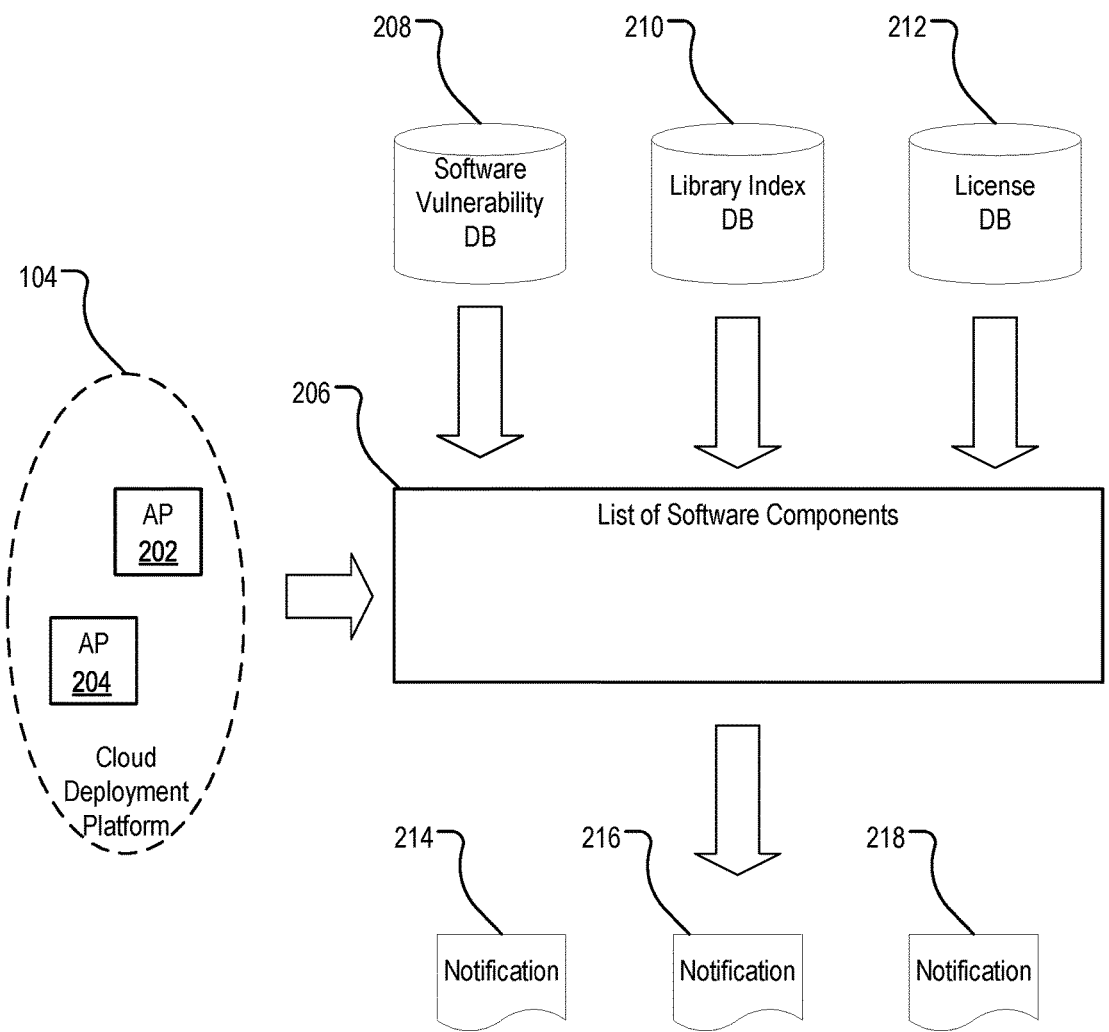
FIG. 2 is a diagram illustrating data flow in an example notification service.

FIG. 2 is a diagram illustrating data flow in an example notification service. A report server, e.g., server 102 of FIG. 1, analyzes application packages deployed on a distributed computing platform. In this specification, the process of analyzing an application package for vulnerability, outdated components, or license compliance is sometimes referred as "scanning" the application package.

The report server communicates with a cloud-based application deployment platform 104 to retrieve information states of currently deployed application packages. Each application package can include any application program, e.g., "MyLedger" or "webmap", deployed on the cloud-based application deployment platform 104. The information states can include library dependency lists for application package 202 and application package 204. Application packages 202 and 204 can include code of the application program, including, for example, binary code, bytecode, script, source code, or any combination of the above. Application packages 202 and 204 can include respective directories in which the respective application program resides, respective library inclusion paths, and various operating system environment variables and other settings for distributed execution of the application program.

The report server obtains copies of application packages 202 and 204. The copies can include bits representing application packages 202 and 204 replicated from the cloud-based application deployment platform 104. In some implementations, the report server also obtains metadata of the application packages 202 and 204. The report server analyzes the bits and the metadata to determine libraries depended upon by the application packages 202 and 204. These libraries can include libraries included in the application packages or otherwise used by the application packages. An application package can use a library when the application program of the package calls a function of the library, links with the library, or otherwise specifies that the application program depends from the library, e.g., by including that library in an inclusion path. The libraries can include, for example, libraries directly used by the application packages and libraries and indirectly used by the application packages, e.g., libraries used by those libraries. The report server generates a list 206 of such libraries. The list 206 can include names of the libraries and versions of the libraries. The name can include a code name of a library, e.g., "iostream" or "java.sql", or a file name, e.g., "mylibrary.jar". The versions can include a version number, a subversion number, a build name, a release code name, or any combination of the above.

Using the library names and versions, the report server retrieves status data from various data stores. For example, the report server retrieves vulnerability data from software vulnerability database 208. The report server retrieves version data from a library index database 210. The version data can include past and current versions of a library. For example, the version data can include a most up-to-date version number of the library, a date of release of the most up-to-date version, or both. The report server retrieves license data from a license database 212. The license data can include license version numbers, license names, and license text for each license associated with each library. Each library in the list 206 can be associated with one or more licenses.

The report server can aggregate the list 206 and status data associated with each library to generate notifications 214, 216 and 218. The report server can send the notifications 214, 216 and 218 to client devices operated by users of the application packages, operators of the deployment platform, developers, or managers of software licensing. The notifications 214, 216 and 218 can include one or more alerts about security vulnerabilities in libraries of the application packages, one or more alerts on out-of-date libraries where later versions are available, one or more alerts on libraries of expired licenses, or any combination of the above.

In some implementations, the report server can automatically update an application package by replacing a library of the application package with another one. For example, the report server can determine that a library of an application package is version X; whereas, according to version data provided by the library index database 210, the most up-to-date version of that component is version Y. The report server can then respond by restaging the application package, e.g., by compiling or linking in the component of version Y, rebuilding the application package, and redeploying the application package in the cloud-based application deployment platform. In some implementations, the report server can present a user interface for restaging, rebuilding, or redeploying the application package.

In some implementations, the report server can compare license data provided from license database 212 with current policies of an organization responsible for the application. The current policies can be stored in a local rules database. Upon determining that the license data and the policies do not match, e.g., one indicating that a library is proprietary and the other indicating that the library is public, the report server can notify the cloud-based application deployment platform 104 to deactivate the application, e.g., by stopping execution of the application. The report server can send a new license to an operator for signature, and notify the cloud-based application deployment platform to reactivate the application upon receiving an electronically signed license update.

Figure 3:
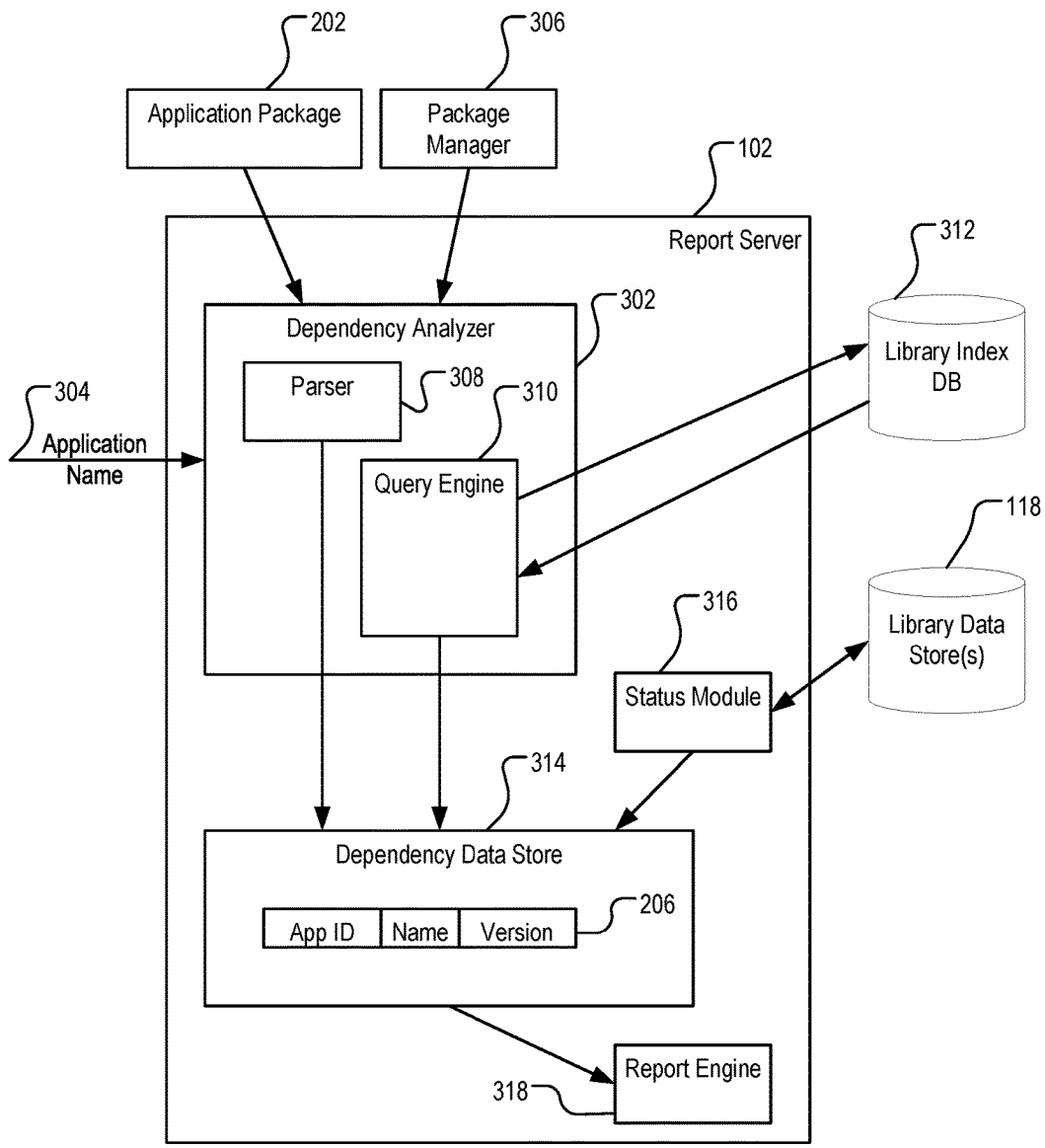
FIG. 3 is a block diagram illustrating components of an example report server of a notification service.

FIG. 3 is a block diagram illustrating components of an example report server 102 of a notification service. The report server 102 includes a dependency analyzer 302. The dependency analyzer 302 includes one or more computer processors configured to determine libraries of an application package and the versions of the libraries.

The dependency analyzer 302 can receive a request 304 from a client device or from a schedule job of the report server 102. The request includes an application identifier, e.g., an application name, that identifies an application package. Optionally, the request can include identifiers for locating the application package in a hierarchical workspace of a distributed computing platform (e.g., the cloud-based application deployment platform 104 of FIG. 1). These identifiers can include, for example, an organization name of an organization operating the application package, and a space name for a workspace under the organization where the application package is staged.

The dependency analyzer 302 then communicates with the cloud-based application deployment platform, locates the application package (e.g., the application package 202) according to the organization and space as specified in the request, and retrieves a copy of the application package 202. In some implementations, the dependency analyzer 302 identifies a package manager 306 to retrieve metadata that includes additional information of the application package. The package manager 306 can be a module responsible for deploying the application package on one or more nodes of the cloud-based application deployment platform. The package manager 306 can provide metadata of the application including, for example, a master data directory of the application, a present working directory of the application, an internal application identifier for uniquely identifying the application package in the cloud-based deployment platform, credentials required to access the application package, environment variable groups, or any combination of the above.

Using the application package 202 and optionally, metadata from the package manager 306, the dependency analyzer 302 can determine libraries used by the application package 202 in one or more passes or processing. In a first pass, a parser 308 of the dependency analyzer 302 can parse the application package 202 and the metadata to determine names and versions of libraries that are hard coded or otherwise represented in text strings. For example, an environment variable can include a text string, e.g., "mylibrary.1.0.0.26.jar", specifying both a name, e.g., "mylibrary", of a library and a version, e.g., "1.0.0.26", of the library.

In some cases, the environment variable can include a text string that specifies an inclusion path, where the name, version, or both, can be missing. In the first pass, the parser 308 can retrieve the inclusion path of libraries and optionally, content, e.g., binaries, of the libraries. In a second pass, the parser 308 can determine a respective signature, e.g., a checksum of each library of the application package based on the content. For example, the parser 308 can visit an inclusion path that is specified in an environment variable and identify a library. The parser 308 can generate a checksum, e.g., a hash value, of the library from the content of the library. The parser 308 can provide the signature, as well as an optional hint (e.g., a partial name or version number) if available, to a query engine 310. The hint can be information that is helpful but not in itself sufficient to determine a particular version of a library. For example, the hint can be a library name unaccompanied by version information.

The query engine 310 is a component of the dependency analyzer 302 configured to connect to a library index database 312 to determine a name and version of a library based on a signature. The library index database 312 can be the same database as library index database 210 of FIG. 2, or a separate database specialized in identifying library names and versions based on signatures and hints. The query engine 310 can issue one or more queries to the library index database 312. Each query includes one or more signatures and optionally, one or more hints. For example, a query can include a checksum of a library or another identifier that uniquely identifies the library and represents content of the library. The query engine 310 receives a response to the query from the library index database 312. The response includes names and versions of libraries the signatures of which match those in the query. The query engine 310 can store the retrieved names and versions in a dependency data store 314. Likewise, the parser 308 can store the names and versions of libraries determined in the first pass in the dependency data store 314.

The dependency data store 314 can store a list 206 of libraries. The list 206 can be stored in a database table having columns including application identifier, e.g., application package name, library name, library version, timestamp of the request, requested status of the application package, e.g., vulnerability only, version dates only, license information only, or any combination of the above, among other information.

The report server 102 includes a status module 316. The status module 316 is configured to integrate the list 206 of library names and versions and status data from one or more library data stores, e.g., library data stores 118. The integrated data can include vulnerability information, whether a library is up-to-date, and license compliance information of each library in the list 206. The report server 102 includes a report engine 318. The report engine 318 is configured to generate one or more reports or notifications based on the integrated data. Examples of the reports and notifications are described in additional details below in reference to FIG. 4.

Figure 4:
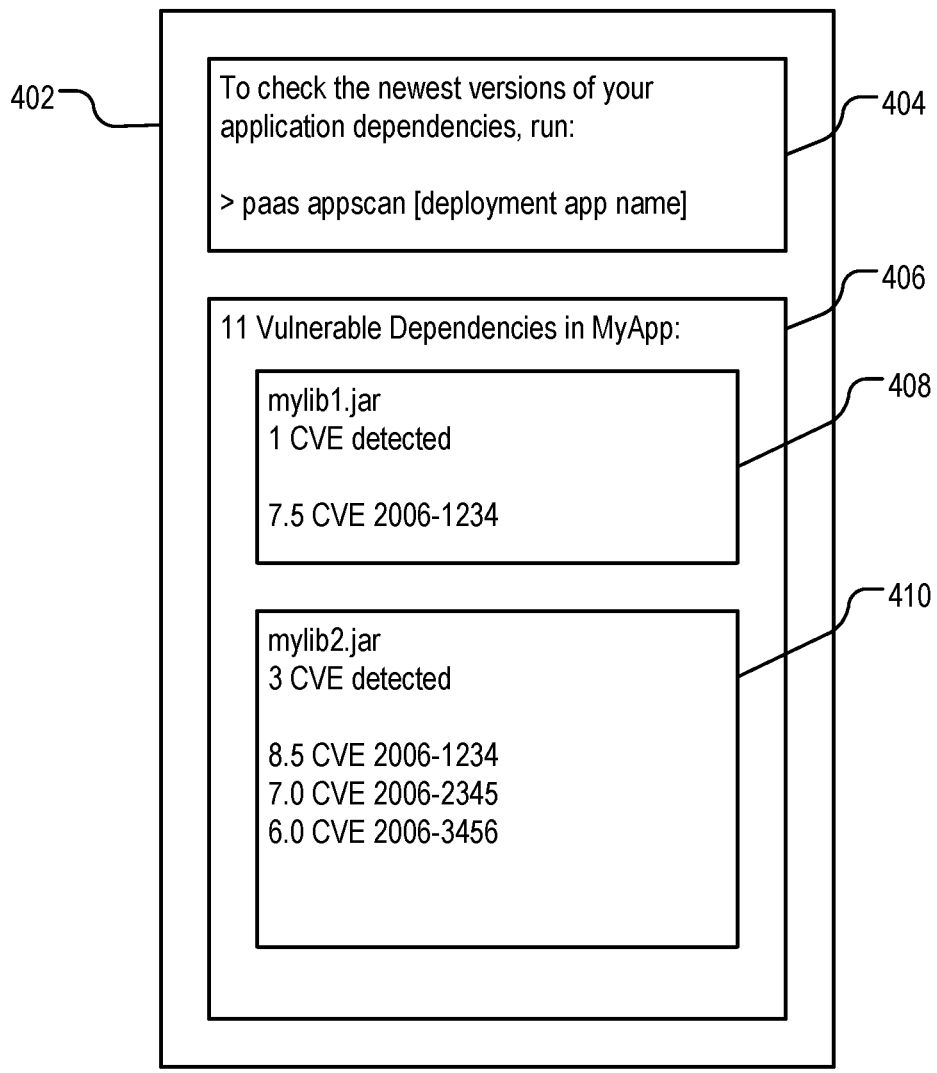
FIG. 4 illustrates an example user interface of a vulnerability notification service.

FIG. 4 illustrates an example user interface 402 of a vulnerability notification service. The vulnerability notification can be a notification generated by a report engine 318 of FIG. 3 and displayed on a user device, e.g., a mobile device. The user interface 402 can be generated by the report engine 318, or a separate user interface component.

The user interface 402 can include a help hint 404 on performing an analysis on an application package using a CLI. For example, the help hint 404 can specify a prefix (e.g., "paas") for indicating that the CLI is for a cloud-based application deployment platform, a name (e.g., "appscan") of a notification service on the cloud-based application deployment platform, and a parameter (e.g., "[deployment app name]") for specifying an application package.

The user interface 402 can include one or more sections for vulnerability, version, and license information. For simplicity, only a vulnerability information section 406 is shown. The vulnerability information section 406 can present information on total number of vulnerabilities or vulnerable libraries identified in an application package (e.g., "11 Vulnerable Dependencies in MyApp"). The vulnerability information section 406 can include a first information section 408 corresponding to a first library (e.g., "mylib1.jar"). The first information section 408 can indicate a count of vulnerabilities detected in the first library. The vulnerability can be counted in common vulnerability and exposure (CVE) identifiers identifying vulnerabilities. The vulnerability can be measured in vulnerability severity scores measuring severity of each CVE. For example, the first information section 408 can indicate that there are a number (N) of CVEs detected, a list of CVE identifiers, and a respective severity score of each CVE.

Likewise, the vulnerability information section 406 can include a second information section 410 corresponding to a second library (e.g., "mylib2.jar"), indicating number of CVEs and severities of the CVEs. Accordingly, in one scrollable message, the user interface 402 can present an integrated view of all vulnerabilities in all libraries of each application package, all outdated or current libraries, all licenses of the components, or any combination of the above. The device presenting the user interface 402 can be configurable in an original request, or as a parameter in a configuration file.

In some implementations, output of a report server, e.g., report server 102 of FIG. 1, can be presented on a command line interface on a user device. Listing 1 below illustrates an example summary report on scans performed at a given time on multiple application packages.

>>paas appscan report

| Listing 1: Example Summary Report | | | | |
|---|---|---|---|---|
| ORG NAME | SPACE NAME | APP | STATUS | STATUS TIME |
| MyOrg | MySandbox | go | scanned successfully | Y:M:D:H:M:S |
| MyOrg | My.space | godep | scanned successfully | Y:M:D:H:M:S |
| MyOrg | Buildpack 1 | App.dot | failed to stage | Y:M:D:H:M:S |
| MyOrg | Buildpack 1 | a.test | scanned successfully | Y:M:D:H:M:S |

In the example shown, the summary report Listing 1 is displayed in response to a CLI command, e.g., "paas appscan report", for generating a report for status analyses that have been performed, without specifying an application name. Listing 1 includes a first column, e.g., "ORG NAME", for indicating organizations for which the scans have been performed. Listing 1 includes a second column (e.g., "SPACE NAME") for indicating workspaces in the organization that have been scanned. Listing 1 includes a third column (e.g., "APP") for indicating application packages scanned in each workspace. Listing 1 includes a fourth column (e.g., "STATUS") for indicating a respective status for each scan. Listing 1 includes a fifth column (e.g., "STATUS TIME") for indicating a respective time for each scan.

Listing 2 below illustrates an example version and license report on versions and licenses of components on an application package.

>>paas appscan report MyOrg My.space godep

| Listing 2: Example Version and License Report | | | |
|---|---|---|---|
| LIBRARY | VERSION | LATEST | LICENSE |
| org.webjars:mymusic-ui | 0.4.0-2 | 0.4.0-3 | MIT License |
| org.springframework:beans | 4.1.1 Release | 4.4.5 Release | Apache License 2.0 |
| org.springframework:dbcp | 1.5 | 1.4 | Apache License 2.0 |
| org.springframework:sql | 2.0.0 Final | 1.2.0 Release | GNU Public License |

In the example shown, the version and license report of Listing 2 is displayed in response to a CLI command (e.g., "paas appscan report MyOrg My.space godep") for generating a report on a specific organization (e.g., "MyOrg"), a specific workspace (e.g., "My.space") and a specific application package (e.g., "godep"). Listing 2 includes a first column (e.g., "LIBRARY") for indicating libraries found to be used, included or otherwise depended upon by that application package. Listing 2 includes a second column (e.g., "VERSION") for indicating a respective version of each library of the application package. Listing 2 includes a third column (e.g., "LATEST") for indicating a respective current (e.g., latest) version for each of the libraries as represented in a library index database. In some cases, a version of a library in the application package can be more up-to-date than the latest version available in the database, indicating, for example, that a newer version is being developed but not yet released. Listing 2 includes a fourth column (e.g., "LICENSE") for indicating a license of each component.

Listing 3 below illustrates an example vulnerability report on vulnerabilities of an application package. The vulnerability report of Listing 3 can be presented in association with the report discussed above in reference to Listing 2.

| Listing 3: Example Vulnerability Report | | | | |
|---|---|---|---|---|
| CVE | CWE | SEVERITY | DEPENDENCY | URL |
| CVE-2016-09 | CWE-16 configuration | 7.5 | dnsns.jar | https://... |
| CVE-2016-11 | CWE-94 Improper Control | 6.4 | jce.jar | https://... |
| CVE-2009-33 | CWE-352 | 6.8 | jsse.jar | https://... |
| CVE-2006-15 | CWE-16 configuration | 4.3 | jsse.jar | https://... |

In the example shown, Listing 3 is displayed in response to a CLI command (e.g., "paas appscan report MyOrg My.space godep"). Listing 3 includes a first column (e.g., "CVE") for indicating a respective CVE identifier for each vulnerability found. Listing 3 includes a second column (e.g., "CWE") for indicating a respective CWE (common weakness enumeration) that includes a respective description of each vulnerability. Listing 3 includes a third column (e.g., "SEVERITY") for indicating a respective severity score of each vulnerability. Listing 3 includes a fourth column (e.g., "DEPENDENCY") for indicating a library where each vulnerability is found. Listing 3 includes a fifth column (e.g., "URL") for providing a respective reference, e.g., a link, to additional sources for each vulnerability found.

The listings above are provided as examples. In various implementations, a report can have various formats, including combinations, variations and rearrangements of the example listings described above. For example, "organizations" and "workspaces" as used above and throughout this specification are example levels of a hierarchical deployment structure. In various implementations, additional hierarchies, and different names of the levels, can be used.

Figure 5:
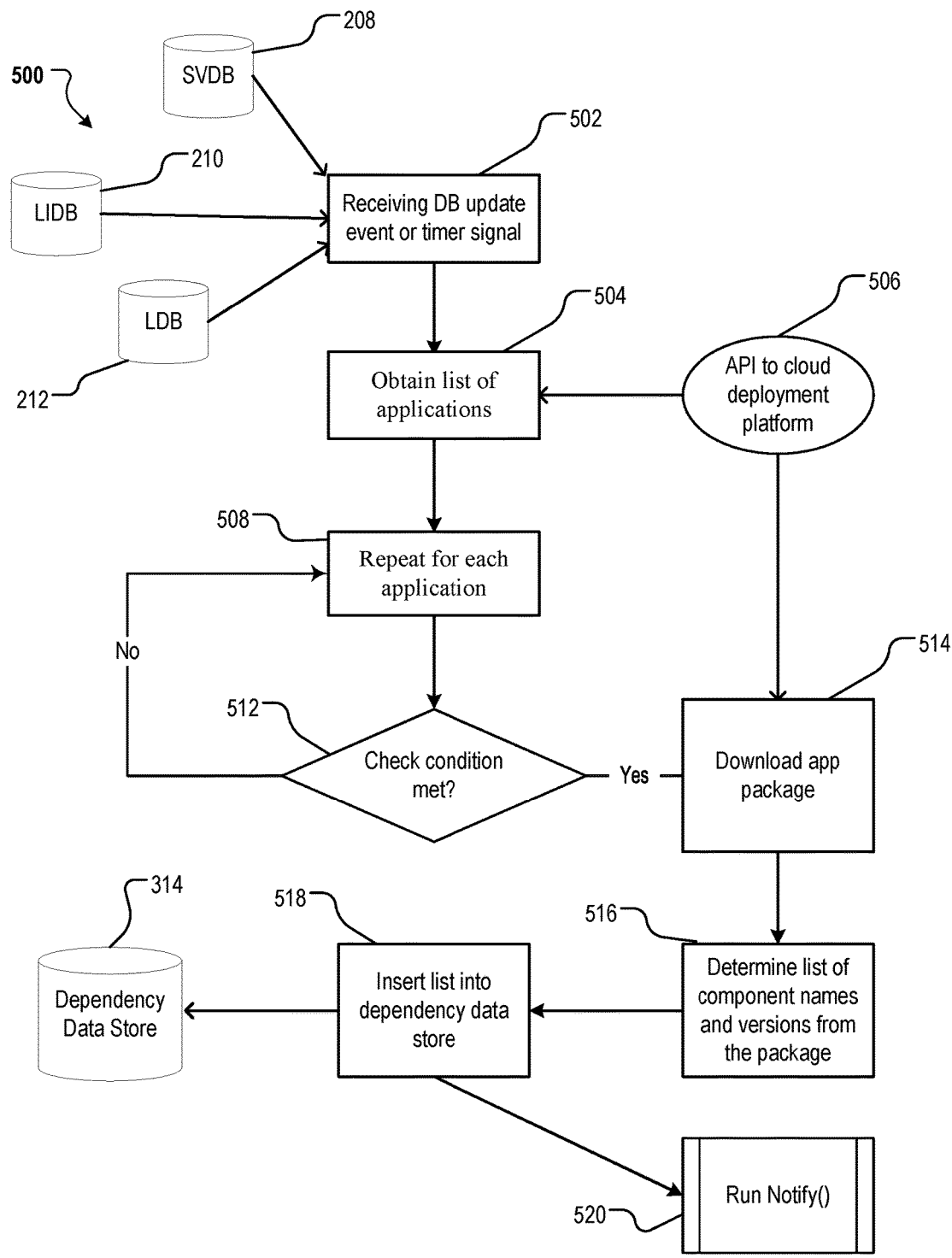
FIG. 5 is a flowchart illustrating an example process of determining library dependencies in deployed application packages.

FIG. 5 is a flowchart illustrating an example process 500 of determining library dependencies in deployed application packages. The process 500 can be performed by a report server, e.g., the report server 102 as described in reference to FIG. 1.

The report server receives (502) a trigger event. The trigger event can include a timer event for performing a scanning job, a CLI input for performing a scanning job, or an update in a database. For example, an update on any of the software vulnerability database 208, library index database 210, or license database 212 can be designated as a trigger event. The update can include, for example, an insertion of a newly discovered vulnerability, a new release of a library, an update on a license, or any combination of the above. In some implementations, the report server can schedule the scanning job at regular intervals (e.g., every day or week, in a cron job or other scheduled job). A scanning job can be a process of scanning for vulnerability, out-of-date dependencies, and license information on one or more specified application packages or on application packages in a specified workspace or organization, or a process of generating a summary report for all organizations and all workspaces. Each of the application packages, workspaces, or organizations can be represented using one or more wildcards, e.g., "?" or "*" of regular expressions.

In response to the trigger event, the report server can obtain (504) a list of application packages. Obtaining the list of application packages can include, for example, receiving the list from a command line input, from an internal database of user options, from an internal database of previously scanned application packages, or any combination of the above. In some implementations, the report server can determine that the list includes all application packages in a workspace or an organization if no specific application package is specified in the trigger event.

In some implementations, the command line inputs can be used to populate an internal database of user options. A first option parameter, e.g., "opt-in" plus organization name, workspace name, application name or a combination of the above, of a CLI can add a specified application package in a specified workspace of a specified organization to a list of application packages to be scanned. A second option parameter, e.g., "opt-out" plus organization name, workspace name, application name or a combination of the above, of a CLI can remove a specified application package from the list. In addition, the first and second parameters can include which aspect of application status to scan, e.g., "opt-invulnerability" for scanning vulnerabilities, "opt-in-all" for scanning all status, or "opt-out-license" for excluding license scans, to provide granular control of what features to scan. In some implementations, the report server can retrieve the list of application packages through an application programming interface (API) 506 of a cloud-based application deployment platform.

The report server can iterate (508) through the application packages, and determine (512) whether a respective condition for scanning each application package is met. The report server can be programmed to evaluate conditions including, for example, (1) if any bit changed for the application package since a last scan; (2) if status of a library that the application package depends upon is updated in database 208, 210 or 212; (3) whether a request specified a forced scan for that application package regardless of whether any update occurred; or (4) any combination of the above.

Upon determining that the condition is not satisfied, the report server goes to a next iteration, until all application packages are scanned or otherwise processed. Upon determining that the condition is satisfied for an application package, the report server downloads (514) the application package, and optionally, metadata of that application package through the API 506. The report server then determines (516) a list of component names and versions from the application packages and metadata. The report server can insert (518) the list of components in a dependency data store 314. The report server can execute a notify process 520 to notify one or more users.

The users can include, for example, an operator of the cloud-based application deployment platform. The notification process 520 can provide information to the operator on which application package executing on the cloud-based application deployment platform is secure or insecure, on which application package executing on the cloud-based application deployment platform is using an outdated or unapproved library, on which application package executing on the cloud-based application deployment platform violates a license compliance condition, or a combination of the above. The report server can include a user interface for the operator to take corresponding actions, or automatically take various actions according to a configuration.

The users can include, for example, a developer of an application package. The notification process 520 can provide information to the developer on when the application package is vulnerable and whether the application package is using an outdated or unapproved library. The report server can include a user interface for the developer to take corresponding actions, or automatically take various actions according to a configuration.

The users can include, for example, a compliance officer of an organization deploying application packages. The notification process 520 can provide information to the compliance officer on whether an application package is using approved libraries. The report server can include a user interface for the compliance officer to take corresponding actions, or automatically take various actions according to a configuration.

The user interfaces can include notifications as discussed in reference to FIG. 4, and, for example, a one-click interface item, e.g., a button, for restaging an application package, a one-click interface item for taking an application offline if an issue cannot be addressed by restaging, or various interface items for escalating an issue.

Figure 6:
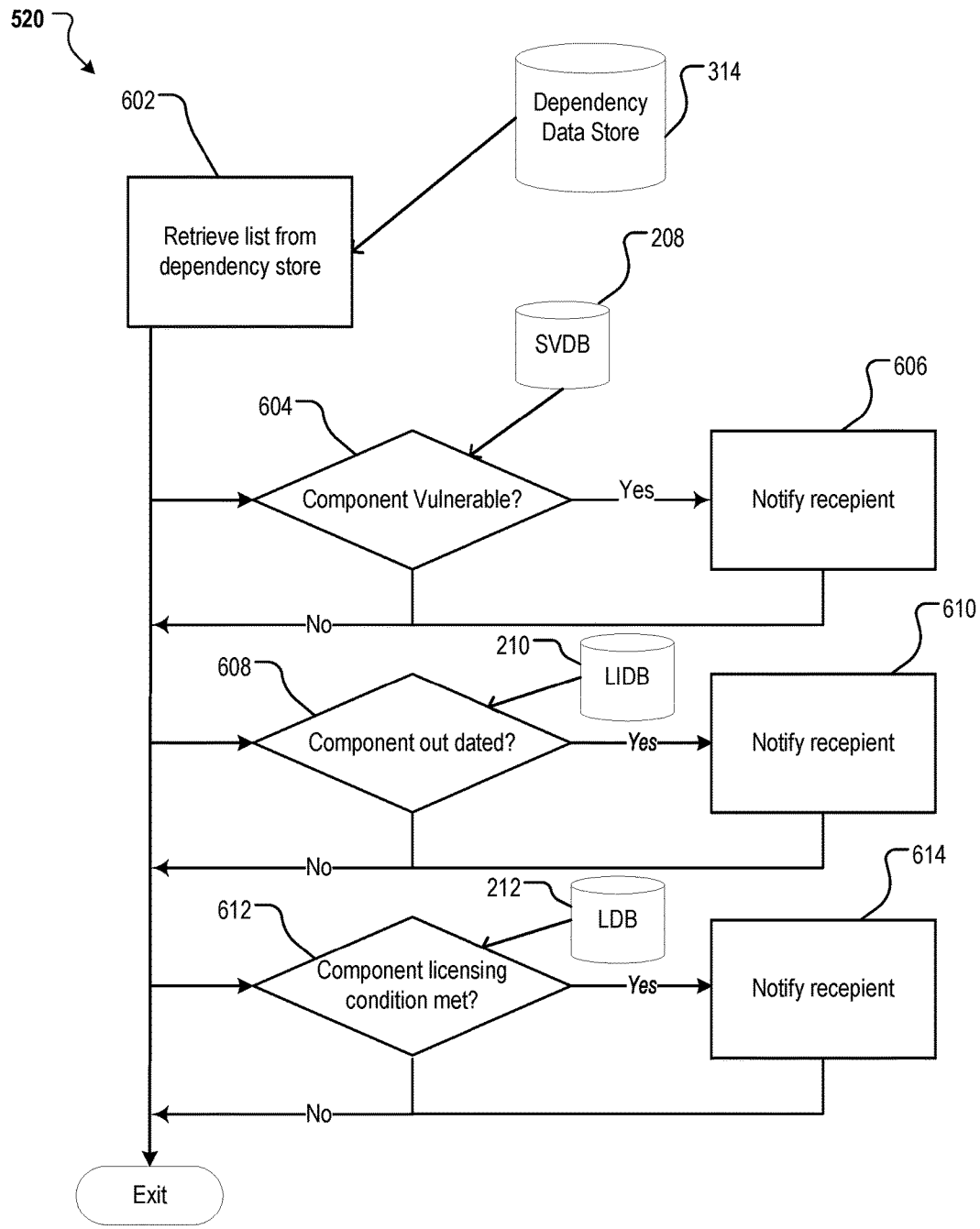
FIG. 6 is a flowchart illustrating an example process of determining notifications on libraries.

FIG. 6 is a flowchart illustrating an example process 520 of determining notifications on libraries. The process 520 can be performed by a report server, e.g., the report server 102 of FIG. 1. The report server retrieves (602) a list of library names and versions from a dependency data store 314. The report server can perform one or more checks to determine whether a particular version of a particular library is vulnerable to security attacks, is out dated, or is compliant with current licenses.

The report server can determine (604) whether a library is vulnerable, e.g., to security attacks, information losses, or privacy leaks. In determining whether the library is vulnerable, the report server can query one or more software vulnerability databases 208. Upon determining that the library is vulnerable, the report server can notify (606) a recipient of the vulnerability. The recipient can be a device or a process, e.g., one that performs automatic restaging operations. Upon determining that the library is not vulnerable, the report server performs a next check.

The report server can determine (608) whether a library is outdated. In determining whether the library is outdated, the report server can query one or more library index databases 210. Upon determining that the library is outdated, the report server can notify (610) a recipient of the outdated status. The recipient can be a device or a process, e.g., one that performs automatic restaging operations. Upon determining that the library is not outdated, the report server performs a next check.

The report server can determine (612) whether a library meets one or more licensing conditions. In determining whether the library meets one or more licensing conditions, the report server can query one or more license databases 212. Upon determining that the library fails to meet one or more licensing conditions, the report server can notify (614) a recipient of the license status. The recipient can be a device or a process, e.g., one that performs automatic restaging operations. Upon determining that the library meets all licensing conditions, the report server performs a next check.

The report server can perform the operations 604, 608 and 610 in any order, serially or in parallel. The report server can omit one or more of the operations 604, 608 and 610, for example, based on opt-in or opt-out setting parameters specifying which operations shall be included and which operations shall be excluded.

Figure 7:
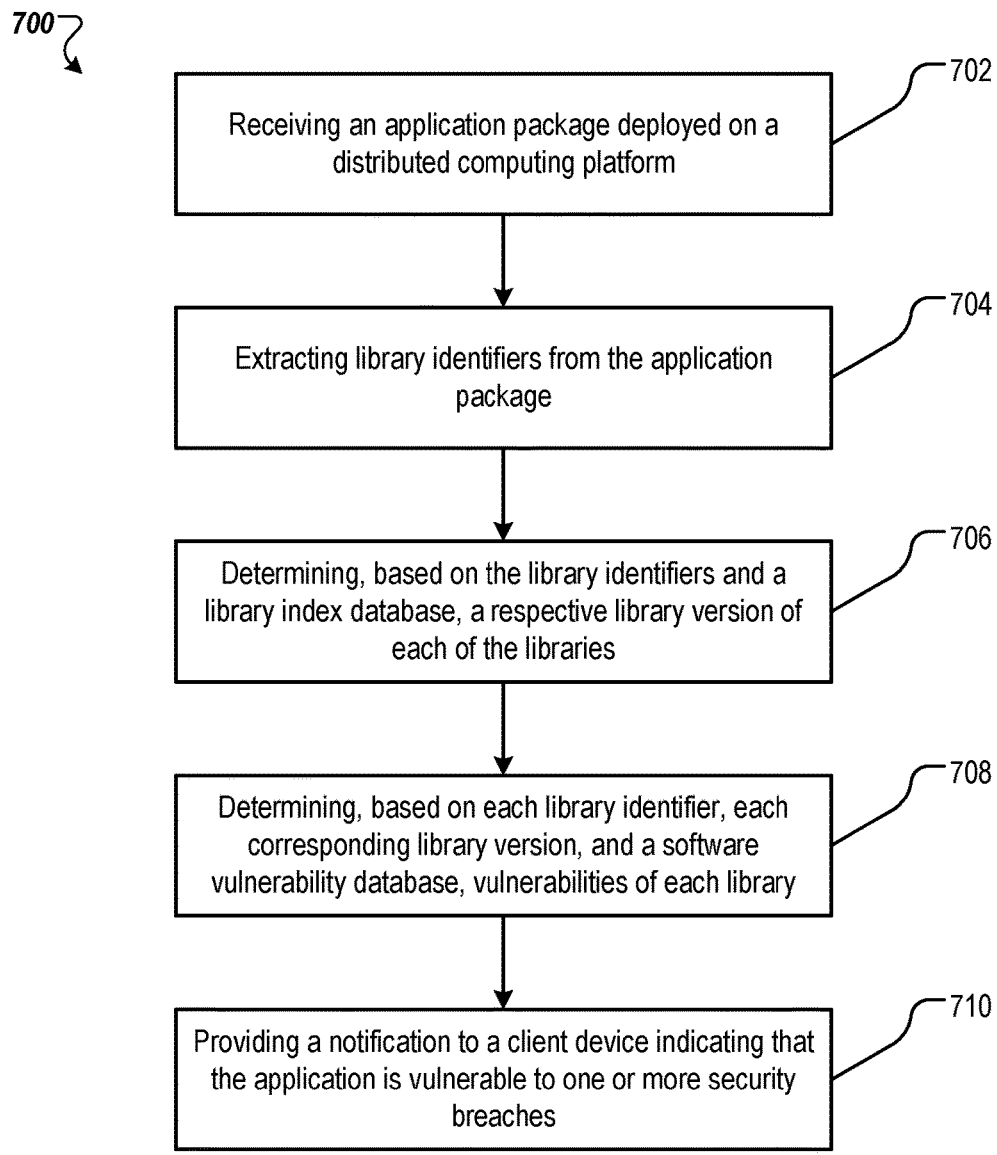
FIG. 7 is a flowchart illustrating an example process of determining vulnerabilities in an application package.

FIG. 7 is a flowchart illustrating an example process 700 of determining vulnerabilities in an application package. Process 700 can be performed by a report server, e.g., the report server 102 of FIG. 1.

The report server receives (702) a copy of an application package deployed on a distributed computing platform. The application package can include an application, e.g., a compiled application program, that depends on multiple libraries. The distributed computing platform can include the cloud-based application deployment platform 104 of FIG. 1, or another type of distributed environment. In some implementations, receiving the application package can include copying, by the report server, content, e.g., bits, of the application package to the report server.

The report server extracts (704) library identifiers from the application package. Each library identifier, e.g., a name or internal identifier, can correspond to a respective library of the application package. Extracting the library identifiers can be triggered by a triggering event. The triggering event can include at least one of the following: a scheduled inspection time having been satisfied; a signature (e.g., a checksum) of the application package having changed value, indicating that the application package has been restaged or otherwise modified; or the software vulnerability database having been updated.

In some implementations, the library identifiers can include library names, library checksums, or both. Extracting the library identifiers includes performing a multi-pass scan of the application package and an environment in which the application package is stored. The environment can include a package manager or a buildpack. The package manager can be a program that staged the application, e.g., by configuring one or more environment variables, inclusion, paths, and library names. The buildpack can be a program, e.g., a script, that provides framework and runtime support for the application.

In a first pass, the report server can extract text strings from at least one of: an environment variable of an operating system of the application package, meta-information of an operating system of the application package, a directory structure storing the application, or an inclusion path of the application as specified in a package manager or buildpack. The inclusion path can include a library load path.

In a second iteration, the report server can determine a respect signature for each library of the application package. The signature can be a checksum, e.g., an MD5 or a SHA-x hash value of a library. The report server can designate the signatures as the library identifiers. The report server can add the extracted text strings, the library signatures, or an association of both in to a list of the library identifiers.

The report server determines (706), based on the library identifiers and a library index database, a respective library version of each of the libraries. Determining the respective library version of each of the components can include querying the library index database using the respective signatures. The report server can obtain each respective library version according to a match between the respect signature in the list of library identifiers and a checksum associated with the library version in the library index database.

The report server determines (708), based on each library identifier, each corresponding library version, and a software vulnerability database, vulnerabilities of each library. The report server can represent each vulnerability for each library using a respective vulnerability identifier and a respective vulnerability severity score. Each vulnerability severity score can indicate a likelihood that a respective library will cause a security breach of the distributed computing platform, a severity of the security breach, or both. Determining the respective vulnerability severity score can include querying the vulnerability database using the each library identifier and the corresponding library version. The report server can obtain the respective vulnerability identifiers and vulnerability severity scores from the software vulnerability database. The vulnerability identifiers can be a CVE identifier. The vulnerability severity score can be, for example, a Common Vulnerability Scoring System (CVSS) score. The software vulnerability database can be the NVD.

In some implementations, the report server estimates a reason of the vulnerability. Estimating the reason can include retrieving the reason from a software vulnerability database using an identifier (e.g., a CVE identifier) of a vulnerability. The report server can estimate that a reason that the vulnerability satisfies the vulnerability threshold is obsolescence of the corresponding library, a newly-discovered form of attack, or both.

The report server provides (710) a notification to a client device indicating that the application package is vulnerable to one or more security breaches upon determining that at a vulnerability score of at least one library of the application package satisfies a vulnerability threshold. Providing the notification to a client device indicating that the application package is vulnerable can include the following operations. The report server can generate a tabulated report that includes the CVE identifier, the vulnerability severity score, a representation of a CWE value, a name of the library, the library version corresponding to the library, and a reference to additional information explaining the vulnerability. The report server can provide the tabulated report to a user device in response to a command-line input from the user device requesting vulnerability analysis on the application package. In some implementations, the report server can generate an electronic mail, a text message, an automated voice mail, or other forms of communication to provide the notification.

Figure 8:
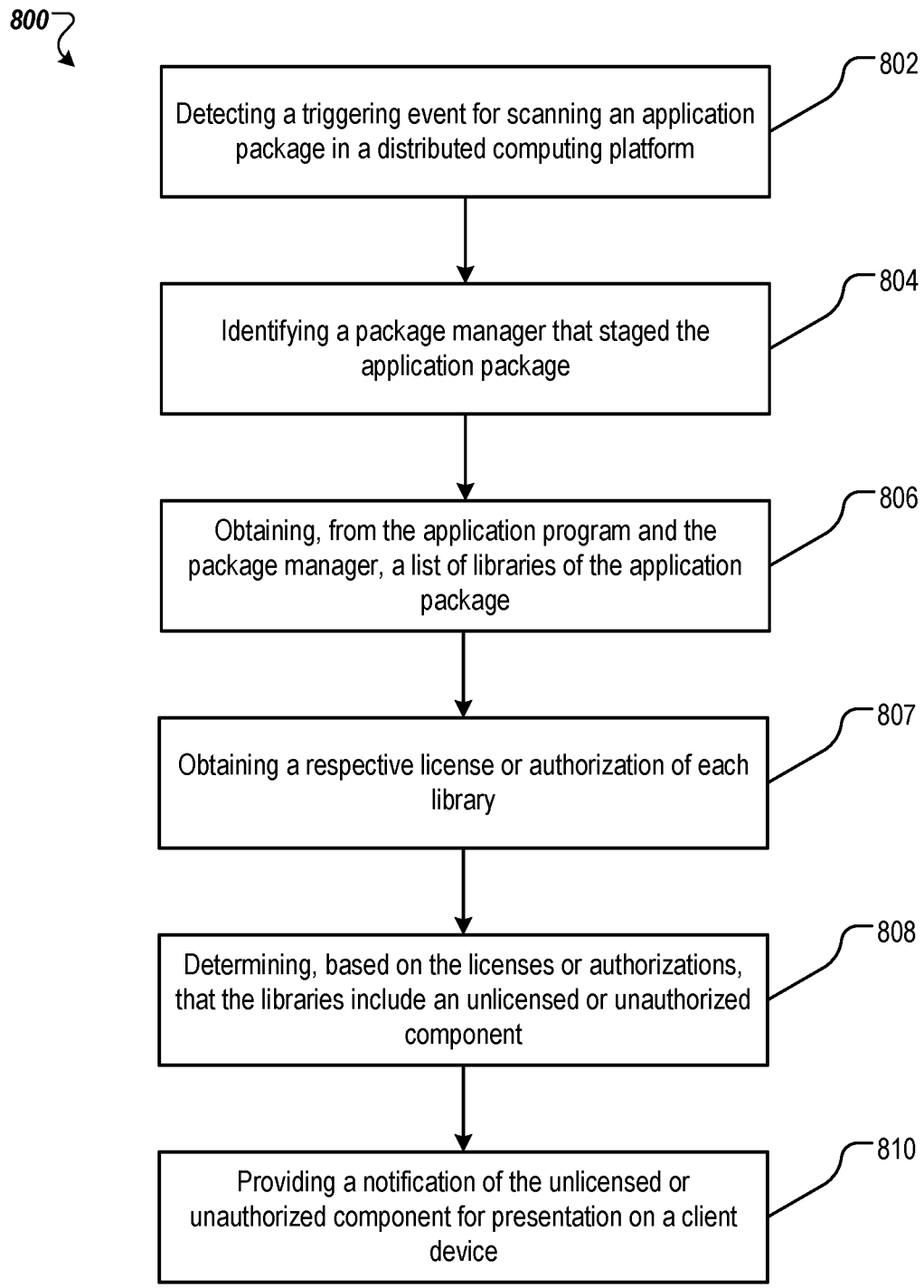
FIG. 8 is a flowchart illustrating an example process of determining license compliance of an application package.

FIG. 8 is a flowchart illustrating an example process 800 of determining license compliance of an application. The process 800 can be performed by a report server, e.g., the report server 102 of FIG. 1.

The report server detects (802) a triggering event for scanning an application package deployed in a distributed computing platform for licensing information. The event provide an identifier of the application package. The event can provide an identifier, e.g., a name, of the application package. The triggering event can include a new release of the application package being staged. The triggering event can include receiving, by the report server, a request from a command line input for scanning the application package or, in some implementations, for scanning a workspace or organization in a hierarchical distributed storage structure where the application package is stored.

The report server identifies (804), in response to the triggering event and based on the release identifier of the application package, a package manager that staged the application package. The package manager can include a program (e.g., a script) that transforms code of an application program into an executable component of the application package for the distributed computing platform.

The report server obtains (806) a list of libraries of the application package from the application package and the package manager. The list includes a respective name and a respective version identifier of each library. Obtaining the list of libraries can include querying the package manager for names and version identifiers of the libraries of the application package.

In some implementations, the report server can receive the names of the libraries and the version identifiers of the libraries from the package manager. The report server can then enter the names and identifiers into the list.

In some implementations, the report server receives a respective path to each of the libraries (e.g., a directory where a library is stored). The report server can obtain the names and identifiers of libraries by querying a library index database. The report server can determine a checksum of each library stored in a directory of the respective path. The report server can perform a lookup in the library index database using the checksum. The library index database can store checksums of multiple versions of each library and version identifiers corresponding to the checksums. The report server can then store a corresponding version identifier returned from the library index database in association with a name in the list.

The report server obtains (807), from the package manager or a license database, respective content of a respective license or a respective authorization of each library. The content can include text of the license or authorization describing permissions and limitations on using each library.

The report server determines (808), based on content of the licenses or authorizations, whether the libraries include an unlicensed or unauthorized component. In determining whether the libraries include an unlicensed or unauthorized component, the report server queries the license database using the respective names and respective version numbers. The report server can retrieve a corresponding software license for each library in the list from the license database. The report server can store a list of rules, permissions, or authorizations for each software license and each library of the application package. The report server compares the rules, permissions, or authorizations with the content to determine any mismatch. For example, the report server can determine that a license contains more terms than those in corresponding stored rules of a library. The report server can determine that the libraries include an unlicensed or unauthorized component upon identifying a mismatch.

In some implementations, the report server can compare license names (e.g., "ABC Public License" vs. "ABC Public License (revised)") to determine whether terms of the license may have changed. In some implementations, the report server can compare license versions (e.g., "ABC Public License" version 1.0 vs. "ABC Public License" version 2.0) to determine whether terms of the license may have changed. Upon determining that the terms may have changed, the report server can determine that the libraries include an unlicensed or unauthorized component.

In some implementations, the report server can determine that the authorization has expired due to an update on the licenses or authorizations. For example, the report server can determine that an expiration date of a license is specified to be a particular date. The report server can determine that a current date is after the particular date. In response, the report server can determine that the libraries include an unlicensed or unauthorized component.

The report server provides (810) a notification of the unlicensed or unauthorized component for presentation on a client device. In some implementations, the report server can provide a user interface item for updating the licenses or authorizations. In some implementations, the report server can provide the notification for presentation on the client device by providing an option with the notification. The option can include a user interface item referencing an update on the permissions. The user interface item is configured to receive a user input for accepting new terms in the update. Upon receiving the user input for accepting the new terms, the report server can update the authorization in accordance to the new terms in a user license database.

In some implementations, providing the notification for presentation on the client device can include providing an option (e.g., a restage button) to restage the application package in accordance to the permissions granted by the license associated with the library. The option can be associated with terms that shall be accepted for restaging the application. The option can be an option to restage the application package using another library as a replacement of the one whose license has expired or the authorization of which is no longer valid.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:

detecting a triggering event for scanning an application package deployed in a distributed computing platform for licensing information, the event providing an identifier of the application package;

identifying, in response to the triggering event and based on the identifier of the application package, a package manager that staged the application package in the distributed computing platform, wherein the package manager is configured to transform code of an application program into an executable component of the application package for the distributed computing platform;

obtaining, from the application package and the package manager, respective paths of a plurality of libraries of the application package;

determining a respective checksum of each respective path of each library of the plurality of libraries of the application package;

performing a name and version lookup in a library index database using each respective checksum to obtain a respective name and a respective version identifier for each library of the plurality of libraries of the application package, wherein the library index database stores checksums of a plurality of versions of a plurality of libraries;

obtaining, from a license database, respective content of a respective license or a respective authorization of each library using the respective name and respective version identifier obtained for the library;

determining, based on content of the licenses or authorizations, that the plurality of libraries of the application package include an unlicensed or unauthorized component; and providing a notification of the unlicensed or unauthorized component for presentation on a client device, wherein the method is performed by one or more processors.

2. The method of claim 1, wherein detecting the triggering event comprises receiving a request from a command line input specifying the application package.

3. The method of claim 1, wherein obtaining the respective paths of the plurality of libraries comprises:
querying the package manager for the respective paths of the plurality of libraries of the application package.

4. The method of claim 1, wherein determining that the plurality of libraries of the application package include an unlicensed or unauthorized component comprises:
retrieving, from the license database, a corresponding software license for each respective name and version identifier obtained for each of the plurality of libraries;
comparing the retrieved licenses with stored rules, permissions, or authorizations to determine conflicts; and
determining whether the plurality of libraries include an unlicensed or unauthorized component based on results of the comparing.

5. The method of claim 1, wherein determining that the plurality of libraries of the application package include an unlicensed or unauthorized component comprises determining that the authorization has expired due to an update on the licenses or authorizations.

6. The method of claim 5, wherein providing the notification comprises providing a user interface item for updating the licenses or authorizations.

7. A system comprising:
one or more computers and one or more storage devices on which are stored instructions that are operable, when executed by the one or more computers, to cause the one or more computers to perform operations comprising:
detecting a triggering event for scanning an application package deployed in a distributed computing platform for licensing information, the event providing an identifier of the application package;
identifying, in response to the triggering event and based on the identifier of the application package, a package manager that staged the application package in the distributed computing platform, wherein the package manage is configured to transform code of an application program into an executable component of the application package for the distributed computing platform;
obtaining, from the application package and the package manager, respective paths of a plurality of libraries of the application package;
determining a respective checksum of each respective path of each library of the plurality of libraries of the application package;
performing a name and version lookup in a library index database using each respective checksum to obtain a respective name and a respective version identifier for each library of the plurality of libraries of the application package, wherein the library index database stores checksums of a plurality of versions of a plurality of libraries:
obtaining, from a license database, respective content of a respective license or a respective authorization of each library using the respective name and respective version identifier obtained for the library;
determining, based on content of the licenses or authorizations, that the plurality of libraries of the application package include an unlicensed or unauthorized component; and
providing a notification of the unlicensed or unauthorized component for presentation on a client device.

8. The system of claim 7, wherein detecting the triggering event comprises receiving a request from a command line input specifying the application package.

9. The system of claim 7, wherein obtaining the respective paths of the plurality of of libraries comprises:
querying the package manager for the respective paths of the plurality of libraries of the application package.

10. The system of claim 7, wherein determining that the plurality of libraries of the application package include an unlicensed or unauthorized component comprises:
retrieving, from the license database, a corresponding software license for each respective name and version identifier obtained for each of the plurality of libraries;
comparing the retrieved licenses with stored rules, permissions, or authorizations to determine conflicts; and
determining whether the plurality of libraries include an unlicensed or unauthorized component based on results of the comparing.

11. The system of claim 7, wherein determining that the plurality of libraries of the application package include an unlicensed or unauthorized component comprises determining that the authorization has expired due to an update on the licenses or authorizations.

12. The system of claim 11, wherein providing the notification comprises providing a user interface item for updating the licenses or authorizations.

13. A non-transitory storage device storing instructions that are operable, when executed by one or more computers, to cause the one or more computers to perform operations comprising:
detecting a triggering event for scanning an application package deployed in a distributed computing platform for licensing information, the event providing an identifier of the application package;
identifying, in response to the triggering event and based on the identifier of the application package, a package manager that staged the application package in the distributed computing platform, wherein the package manage is configured to transform code of an application program into an executable component of the application package for the distributed computing platform;
obtaining, from the application package and the package manager, respective paths of a plurality of libraries of the application package;
determining a respective checksum of each respective path of each library of the plurality of libraries of the application package;
performing a name and version lookup in a library index database using each respective checksum to obtain a respective name and a respective version identifier for each library of the plurality of libraries of the application package, wherein the library index database stores checksums of a plurality of versions of a plurality of libraries;
obtaining, from a license database, respective content of a respective license or a respective authorization of each library using the respective name and respective version identifier obtained for the library;
determining, based on content of the licenses or authorizations, that the plurality of libraries of the application package include an unlicensed or unauthorized component; and
providing a notification of the unlicensed or unauthorized component for presentation on a client device.

14. The non-transitory storage device of claim 13, wherein
detecting the triggering event comprises receiving a request from a command line input specifying the application package.

15. The non-transitory storage device of claim 13, wherein obtaining the respective paths of the plurality of of libraries comprises:
   querying the package manager for the respective paths of the plurality of libraries of the application package.

* * * * *

UNITED STATES PATENT AND TRADEMARK OFFICE
CERTIFICATE OF CORRECTION

PATENT NO. : 10,229,251 B1  
APPLICATION NO. : 15/235042  
DATED : March 12, 2019  
INVENTOR(S) : Michael Dalessio et al.

Page 1 of 1

It is certified that error appears in the above-identified patent and that said Letters Patent is hereby corrected as shown below:

In the Claims

Column 19, Line 38, in Claim 7: delete "manage" and insert --manager--, therefor.

Column 19, Line 54, in Claim 7: delete "libraries:" and insert --libraries;--, therefor.

Column 20, Line 2, in Claim 9: delete "of of" and insert --of--, therefor.

Column 20, Line 36, in Claim 13: delete "manage" and insert --manager--, therefor.

Column 21, Line 2, in Claim 15: delete "of of" and insert --of--, therefor.

Signed and Sealed this
Fourteenth Day of May, 2019

Andrei Iancu
*Director of the United States Patent and Trademark Office*